United States Patent Office 3,049,525
Patented Aug. 14, 1962

3,049,525
POLYDIVINYLBENZENE
Calvin J. Benning, Kensington, Md., assignor to W. R. Grace & Co., Clarksville, Md., a corporation of Connecticut
No Drawing. Filed June 25, 1959, Ser. No. 822,757
2 Claims. (Cl. 260—93.5)

Summarily this invention is directed to preparing polydivinylbenzene by mixing divinylbenzene dissolved in an inert hydrocarbon solvent with $TiCl_3$ at room temperature.

The following example illustrates without limiting the invention.

*Example 1*

A 50% (by weight) solution of divinylbenzene (a commercial mixture of ortho, meta, and para isomers) in ethylbenzene (a total of 30 ml.) was placed in a 500 ml. flask containing 2 grams of finely ground $TiCl_3$ suspended in 200 ml. cyclohexane. All material handling was carried out under argon so as to exclude oxygen, water vapor and other contaminants. The flask was closed and agitated for 24 hours at 25° C. At the end of the run the solution was filtered to remove the catalyst and diluted with 200 ml. methanol to precipitate solid divinylbenzene. This solid polymer was filtered and dried. Yield: 2 grams, or 15.4% of theory.

In carrying out this invention, an inert hydrocarbon solvent is suitable, for example: pentane, hexane, heptane, octane, benzene, toluene, xylene, and the like. The temperature of polymerization is not critical, any temperature within the range of 25–100° C. being suitable. Nor is the reaction time critical, some polymer being formed almost instantly on contacting the monomer with the catalyst. Most of the polymerization takes place within 24 hours; after that the reaction is quite slow.

The ratio of catalyst to monomer is not critical. A suitable weight ratio range of $TiCl_3$:divinylbenzene being 0.001:1. For practical purposes a weight ratio range of 0.01 to 0.2 gram of catalyst per gram of monomer is preferred.

Polydivinylbenzene prepared by this process is substantially identical to polydivinylbenzene prepared by prior art procedures and has the same uses.

I claim:
1. The process of preparing polydivinylbenzene comprising contacting divinylbenzene with a catalyst consisting essentially of $TiCl_3$ in an inert hydrocarbon solvent at a temperature in the range of 25–100° C.
2. The method of preparing polydivinylbenzene according to claim 1 comprising mixing at room temperature a 50% weight solution of divinylbenzene in ethylbenzene with a suspension of $TiCl_3$ in cyclohexane, agitating the reactants until polydivinylbenzene is formed, and recovering the thus-formed polymer.

References Cited in the file of this patent
UNITED STATES PATENTS

| | | |
|---|---|---|
| 1,811,078 | Dykstra | June 23, 1931 |
| 2,970,133 | Sistrunk | Jan. 31, 1961 |

OTHER REFERENCES

Galloway: Chemical Reviews, vol. 17, pages 374–5. (Copy in Sci. Lib.)